Oct. 2, 1945.  E. G. LANDBERG  2,386,165
BEARING
Filed Nov. 18, 1943  2 Sheets-Sheet 1

INVENTOR.
Erik G. Landberg
BY
his Attorney

Oct. 2, 1945.  E. G. LANDBERG  2,386,165
BEARING
Filed Nov. 18, 1943  2 Sheets-Sheet 2

INVENTOR.
Erik G. Landberg
BY
his Attorney

Patented Oct. 2, 1945

2,386,165

UNITED STATES PATENT OFFICE 2,386,165

BEARING

Erik G. Landberg, Seneca Falls, N. Y., assignor to Goulds Pumps, Inc., Seneca Falls, N. Y., a corporation of New York Application November 18, 1943, Serial No. 510,819

8 Claims. (Cl. 308—15)

My invention relates to bearings and more particularly to a bearing suitable for use in connection with a centrifugal pump.

While the invention has uses in connection with other types of machinery, it has primarily been designed for use in connection with a centrifugal pump. In my copending application, Serial Number 488,312, I have shown a multi-stage centrifugal pump in connection with which the bearing herein shown and described may be advantageously employed.

An object of my invention is to provide a simple, trouble-free bearing assembly for a rotating shaft.

Another object of my invention is to provide a bearing assembly which is provided with retainers at each of its ends adapted to hold the bearing centrally located with respect to its shaft.

My invention further contemplates the provision of a bearing assembly in which the shaft bearing is provided with a retainer at each of its ends adapted to hold the bearing rigid with respect to the shaft and so that, when expansion of the bearing occurs resulting from heat, the bearing will still be retained concentric with the shaft.

Other objects and advantages of my invention will be pointed out in the claims and will be apparent from the following description, when taken in connection with the accompanying drawings, in which:

Figure 1:
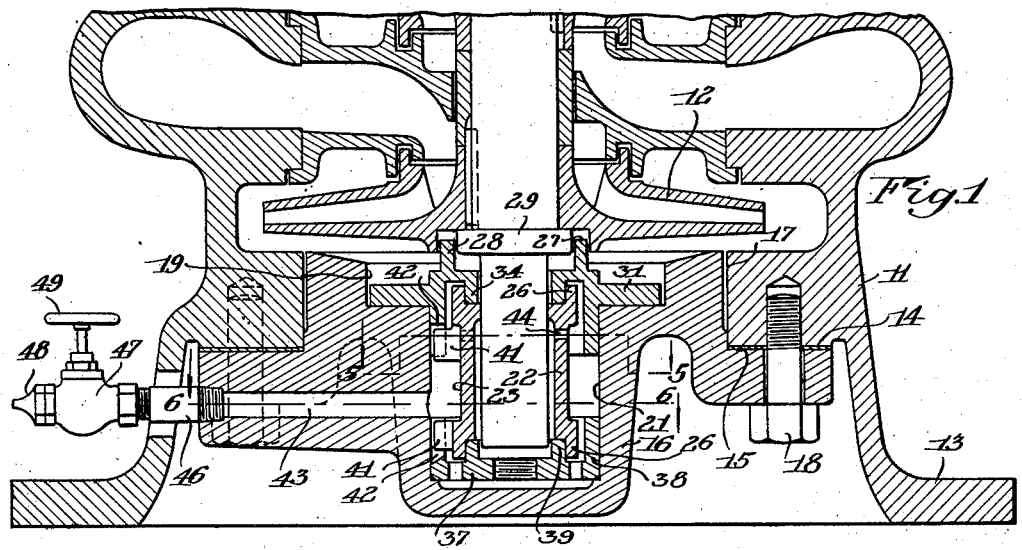
Fig. 1 is a sectional view showing the bearing assembly and the bearing of my invention as applied to a multi-stage centrifugal pump.
Figure 9:
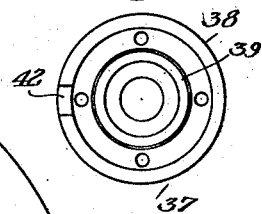
Fig. 9 is a top plan view of the outer bearing retainer.
Figure 2:
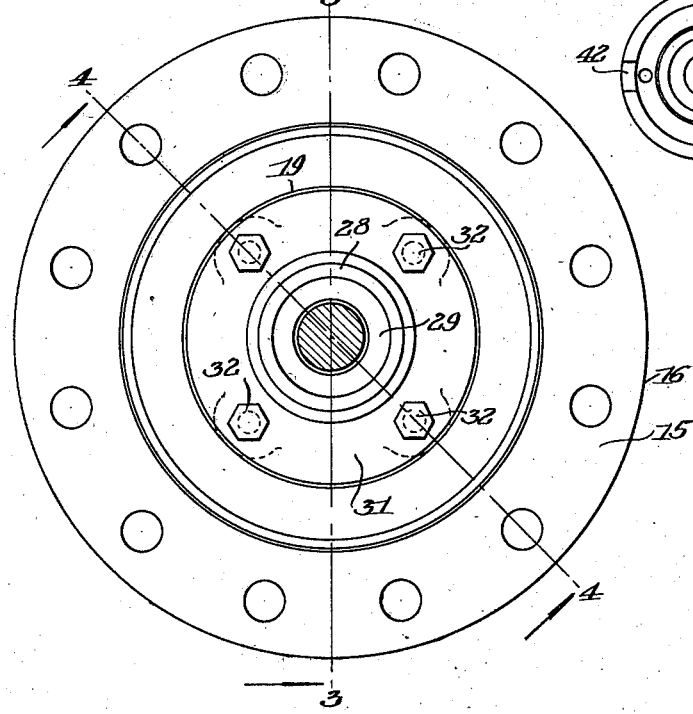
Fig. 2 is a top plan view of the bearing assembly.

The bearing and bearing assembly of my invention have numerous other applications. However, for purposes of illustration it has been shown in use in connection with the lower bearing of a multi-stage centrifugal pump which may be of the type, for example, shown in my copending application, Serial Number 488,312, filed May 22, 1943.

In accordance with the above mentioned application the lower portion of the centrifugal pump casing 11 has been shown, together with the last stage 12 of the centrifugal pump impeller. The pump casing is provided with a base 13 upon which the pump assembly is adapted to rest and has an annular machined face 14 for the reception of a bearing housing, generally indicated by the numeral 16.

The bearing housing has an annular machined face 15 adapted to cooperate with the face 14 and is adapted to fit within a bore 17 provided in the pump casing. The bearing housing is held in position by a series of bolts or cap screws 18 which are threaded into the casing, a suitable gasket being provided between the faced surfaces 14 and 15.

The bearing housing 16 is provided with a bore 19 and a counter bore 21 adapted to receive a bearing assembly, generally indicated by the numeral 22. It will be understood that the bearing is adapted to withstand high pressures, such as are encountered in a multi-stage centrifugal pump. Moreover, the bearing may be made of materials adapted to resist corrosive action when the pump is used in connection with the pumping of sea water, as encountered when the pump is used for marine service.

Figure 3:
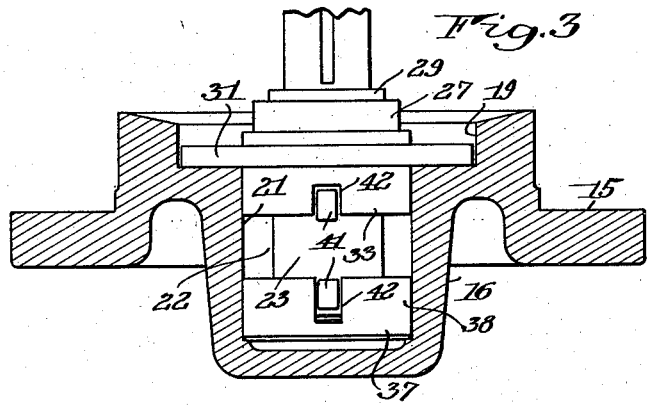
Fig. 3 is a view partly in section taken substantially on the line 3—3 of Fig. 2.
Figure 4:
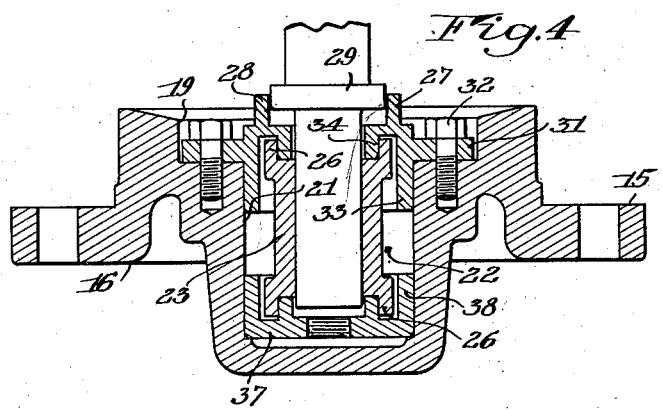
Fig. 4 is a view taken substantially on the line 4—4 of Fig. 2.
Figure 5:
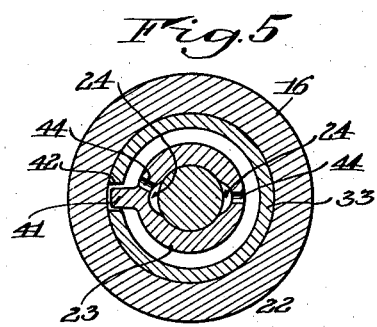
Fig. 5 is a view taken substantially on the line 5—5 of Fig. 1.
Figure 6:
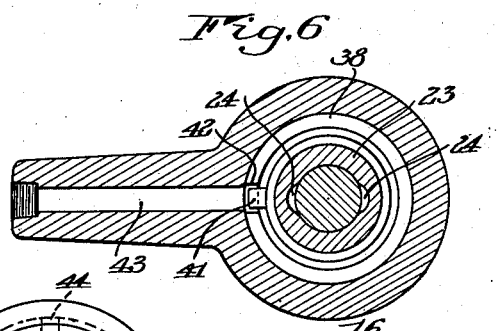
Fig. 6 is a view taken substantially on the line 6—6 of Fig. 1.
Figure 7:
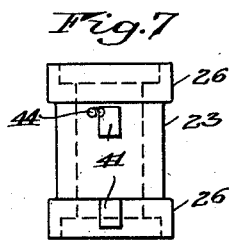
Fig. 7 is a view of the bearing removed from the bearing assembly.
Figure 8:
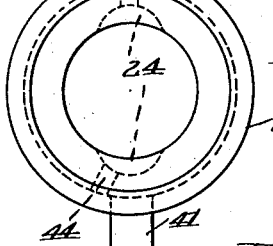
Fig. 8 is a top plan view of Fig. 6.

The bearing assembly is shown most clearly in Figs. 3 and 4, and comprises a cylindrical bearing element 23 which throughout the major portion of its inner circumference is fitted to the shaft. The inner circumference is provided with recesses or cut-out parts 24 for the reception of lubricant. The bearing element 23 is enlarged at each of its ends and is provided at each of such ends with a bore 26 for the reception of a bearing retainer.

The upper or inner bearing retainer, generally indicated by the numeral 27, has a skirt portion 28 adapted to loosely fit an enlargement 29 on the shaft and is provided with a flange 31 through which the upper retainer may be bolted to the bearing housing, as indicated at 32. The inner bearing retainer has a depending collar portion 33 adapted to be fitted within the bore 21 to properly locate the bearing. The retainer is provided with an annular flange 34, the outer periphery of which is press fitted against the inner annular surface formed by the bore 26.

A lower or outer bearing retainer 37 is provided for the bearing which has a collar portion 38 adapted to be fitted within the bore 21 formed in the bearing housing. The outer bearing retainer is also provided with an annular flange 39 the outer periphery of which is press fitted into the bore 26 formed at the lower end of the bearing element 23.

With the above arrangement it will be appreciated that leakage of liquid will take place from the pressure space about the last stage impeller 12 to the lower end of the bearing, and that the pressure throughout the bearing housing will be substantially equalized. With the pump running and up to pressure after this equalization occurs substantially no circulation of liquid occurs through the bearing. This is desirable to prevent the lubricant from being washed away, and dirt or grit contained in the liquid being pumped to enter the bearing.

When the bearing heats up the expansion thereof occurs uniformly about the axis of the shaft and the press fit arrangement of the inner and outer bearing retainers holds the bearing assembly concentric with the shaft. An expansion of a few thousandths of an inch, which is all that normally occurs, is insufficient to prevent the retainers from holding the bearing concentric with the shaft.

For the purpose of preventing rotation of the bearing with the shaft, the bearing element 23 is provided with a pair of projecting lugs 41 which are adapted to fit within notches 42 formed in the collars 33 and 38 of the inner and outer bearing retainers. It will be appreciated that the retainers are locked in concentric relation with the shaft.

For the purpose of lubricating the bearing, I have provided a passage 43 in the bearing housing which communicates through a pair of openings 44 formed in the bearing element 23 with the lubricant cavities 24 formed in the bearing element. The outer end of the passage 43 is fitted with a nipple 46 adapted to receive a fitting 47. The fitting is provided with any suitable means, as indicated at 48, for the reception of a grease gun or other means of supplying lubricant, preferably a grease, under pressure to the bearing assembly.

For the reason that the pump is adapted to develop high pressures, a valve, indicated by the numeral 49, is preferably employed so that, except during periods of lubricating the bearing, the valve may be closed. This prevents the full pressure of the pump from being applied to the check valve of the grease fitting which might result in leakage.

It will now be appreciated that I have provided a bearing which is so constructed that it can freely expand from the shaft with an increase in temperature and still remain firm and centered by the retainers. Moreover, the pressure at both ends of the bearing is equalized which prevents circulation of water through the bearing. When expansion occurs, which is usually not more than a few thousandths of an inch, there will be a tendency to loosen the press fits of the inner and outer retainers with respect to the bearing. However, this slight expansion is insufficient to prevent the retainers from holding the bearing element centrally with respect to its shaft.

While I have shown and described the preferred form of my invention, it will be appreciated that various changes and modifications may be made therein, particularly in the form and relation of parts, without departing from the spirit of my invention as set forth in the appended claims.

I claim:

1. A bearing assembly comprising a bearing element extending in concentric relation with a shaft, a retainer for each end of the bearing element, means for fitting the retainers with respect to the bearing element, a bearing housing adapted to hold the retainers rigidly in position and concentric with the shaft, and interlocking members between the bearing element and the retainers to prevent rotation of the bearing element with the shaft.

2. A bearing assembly comprising a bearing element extending in concentric relation with a shaft, a retainer for each end of the bearing element, means for fitting the retainers with respect to the bearing element, a bearing housing adapted to hold the retainers rigidly in position and concentric with the shaft, interlocking members between the bearing element and the retainers to prevent rotation of the bearing element with the shaft, and means including passages through the bearing housing and the bearing element for lubricating the bearing.

3. A bearing assembly comprising a bearing element extending in concentric relation with a shaft, said bearing element having enlarged ends, said enlarged ends having bores extending concentric with the shaft, a retainer for each end of the bearing element, each of said retainers having a part which is press fitted into one of said bores.

4. A bearing assembly comprising a bearing element extending in concentric relation with a shaft, said bearing element having enlarged ends, said enlarged ends having bores extending concentric with the shaft, a retainer for each end of the bearing element, each of said retainers having a part which is press fitted into one of said bores, and a bearing housing in which said retainers are locked in concentric relation with the shaft.

5. A bearing assembly comprising a bearing element extending in concentric relation with a shaft, said bearing element having enlarged ends, said enlarged ends having bores extending concentric with the shaft, a retainer for each end of the bearing element, each of said retainers having a part which is press fitted into one of said bores, a bearing housing in which said retainers are locked in concentric relation with the shaft, and interlocking members between the bearing element and the retainers to prevent rotation of the bearing element with the shaft.

6. A bearing assembly comprising a bearing element extending in concentric relation with a shaft, said bearing element having enlarged ends, said enlarged ends having bores extending concentric with the shaft, a retainer for each end of the bearing element, each of said retainers having a part which is press fitted into one of said bores, a bearing housing in which said retainers are locked in concentric relation with the shaft, interlocking members between the bearing element and the retainers to prevent rotation of the bearing element with the shaft, and means including passages through the bearing housing and the bearing element for lubricating the bearing.

7. A bearing assembly comprising a bearing element extending in concentric relation with a shaft, a retainer for each end of the bearing element, means for holding the retainers rigidly in position, said bearing element having portions facing the shaft at each end thereof and said retainers having parts which engage said facing portions to hold the bearing concentric with the shaft while permitting expansion of the bearing as heat is generated.

8. A bearing assembly comprising a bearing element extending in concentric relation with a shaft, a retainer for each end of the bearing element, means for holding the retainers rigidly in position, said bearing element having portions facing the shaft at each end thereof, said retainers having parts which engage said facing portions to hold the bearing concentric with the shaft while permitting expansion of the bearing as heat is generated, and means for locking the bearing against rotation with the shaft.

ERIK G. LANDBERG.